(12) United States Patent
Dantes et al.

(10) Patent No.: US 6,789,752 B2
(45) Date of Patent: Sep. 14, 2004

(54) FUEL INJECTION

(75) Inventors: Guenter Dantes, Eberdingen (DE); Detlef Nowak, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 10/169,848

(22) PCT Filed: Oct. 23, 2001

(86) PCT No.: PCT/DE01/03979

§ 371 (c)(1),
(2), (4) Date: Dec. 13, 2002

(87) PCT Pub. No.: WO02/35082

PCT Pub. Date: May 2, 2002

(65) Prior Publication Data

US 2003/0121997 A1 Jul. 3, 2003

(30) Foreign Application Priority Data

Oct. 23, 2000 (DE) .......................................... 100 52 485

(51) Int. Cl.[7] .............................................. F02M 61/00
(52) U.S. Cl. ................ 239/533.12; 239/491; 239/533.2; 239/533.3; 239/533.11; 239/585.1
(58) Field of Search .......................... 239/533.2, 533.3, 239/533.11, 533.12, 585.1, 491

(56) References Cited

U.S. PATENT DOCUMENTS

| 4,971,254 A | * 11/1990 | Daly et al. ............. 239/533.12 |
| 5,288,025 A | 2/1994 | Cerny |
| 5,423,489 A | * 6/1995 | Wood ...................... 239/585.1 |
| 6,003,791 A | * 12/1999 | Reiter ..................... 239/585.5 |
| 6,015,103 A | * 1/2000 | Kotkowicz ............. 239/533.12 |
| 6,572,028 B1 | * 6/2003 | Fly et al. ............... 239/533.12 |

FOREIGN PATENT DOCUMENTS

| DE | 34 39 892 | 5/1985 |
| DE | 36 43 523 | 6/1988 |
| DE | 196 25 059 | 1/1998 |
| EP | 0 971 124 | 1/2000 |

* cited by examiner

*Primary Examiner*—Robin O. Evans
(74) *Attorney, Agent, or Firm*—Kenyon & Kenyon

(57) ABSTRACT

A fuel injector, in particular for the direct injection of fuel into the combustion chamber of a mixture-compressing, externally fired internal combustion engine, comprising, upstream from a valve-seat surface, a swirl disk provided with swirl channels from which, given an open fuel injector, the fuel flows with a circumferential speed into a swirl chamber which is also located upstream from the valve-seat surface. Each point downstream from the swirl disk (35) through which a flow is to pass has a larger extension in every spatial direction than the diameter of the swirl channels.

28 Claims, 2 Drawing Sheets

FUEL INJECTION

FIELD OF THE INVENTION

The present invention relates to a fuel injector.

BACKGROUND INFORMATION

Fuel injectors which are provided with a disk with fuel channels for guiding a valve-closure member and for generating a swirl in the fuel flow are described in German Patent Application No. DE 36 43 523. The fuel channels have a tangential component, which imparts a circumferential component to the velocity vector of the flow. The flow cross-section, which is open across the entire cross-section of the fuel channel, has a restricting effect on the flow rate. Throttling the flow causes a pressure decrease at the disk, which is utilized to form a sealing surface pressure and to avoid a secondary flow path. Fuel metering and swirl generation occur upstream from the sealing seat. With the aid of a bore introduced in the center of the disk, the valve-closure member, and the valve needle, respectively, are also radially guided, the tolerance of the gap formed between the valve needle, or the valve-closure member, being chosen so as to obtain an hydraulically sealing fit.

Another fuel injector is described in German Patent Application No. DE 196 25 059, where the metering of the fuel quantity and the formation of a swirl-imparted flow also occur upstream from the sealing seat. In this case, the fuel channels, which are used to meter the fuel, are designed either as bores or as grooves, the grooves being closed by the valve-seat surface to form swirl channels.

Both of the above-described fuel injectors have fuel channels whose cross-section determines the metering of a specific fuel quantity. Simultaneously, the tangential components of the fuel channels produce a swirl in the fuel flow. Observing tight tolerances when introducing the flow channels is thus of paramount importance for the precise metering of the fuel quantity to be injected. This makes the manufacture expensive, which is a disadvantage.

Another disadvantage of the mentioned fuel injectors is the strong response to contamination of the channels. A modification of the cross-section as a result of contaminated channels causes a change in the metered quantity and, due to the swirl generation, a change in the jet angle as well.

Moreover, the possible deposition of dirt particles contained in the fuel in the area of the valve-sealing seat is also disadvantageous. Deposits formed in the area of the valve-sealing seat prevent a complete closing of the fuel injector and, in this way, may allow the escape of a small quantity of fuel after the spray-off process has been concluded. A degraded mixture formation and combustion are the result.

SUMMARY

A fuel injector according to an example embodiment of the present invention, may have the advantage that dirt particles that are carried through the swirl channels by the fuel flow have no opportunity to settle along the further flow route. The swirl channels constitute the narrowest dimension of the flow route to the spray-off orifice, so that a contamination of the sealing seat is prevented.

The small diameter of the individual swirl channels acts as a filter for any dirt particles present in the fuel flow. The dirt particles are filtered out at the upstream side of the swirl disk.

Also advantageous is the minimal effect a contamination of individual swirl channels has on the swirl formation. The clogging that may occur at the upstream side of the swirl disk by filtering out dirt particles that are carried along, reduces the entire unobstructed flow cross-section only to a minimal extent. The effect on the swirl generation is negligible.

BRIEF DESCRIPTION OF THE DRAWINGS

An exemplary embodiment of the present invention is represented in simplified form in the drawing and elucidated in more detail in the following description.

DETAILED DESCRIPTION

Figure 1:
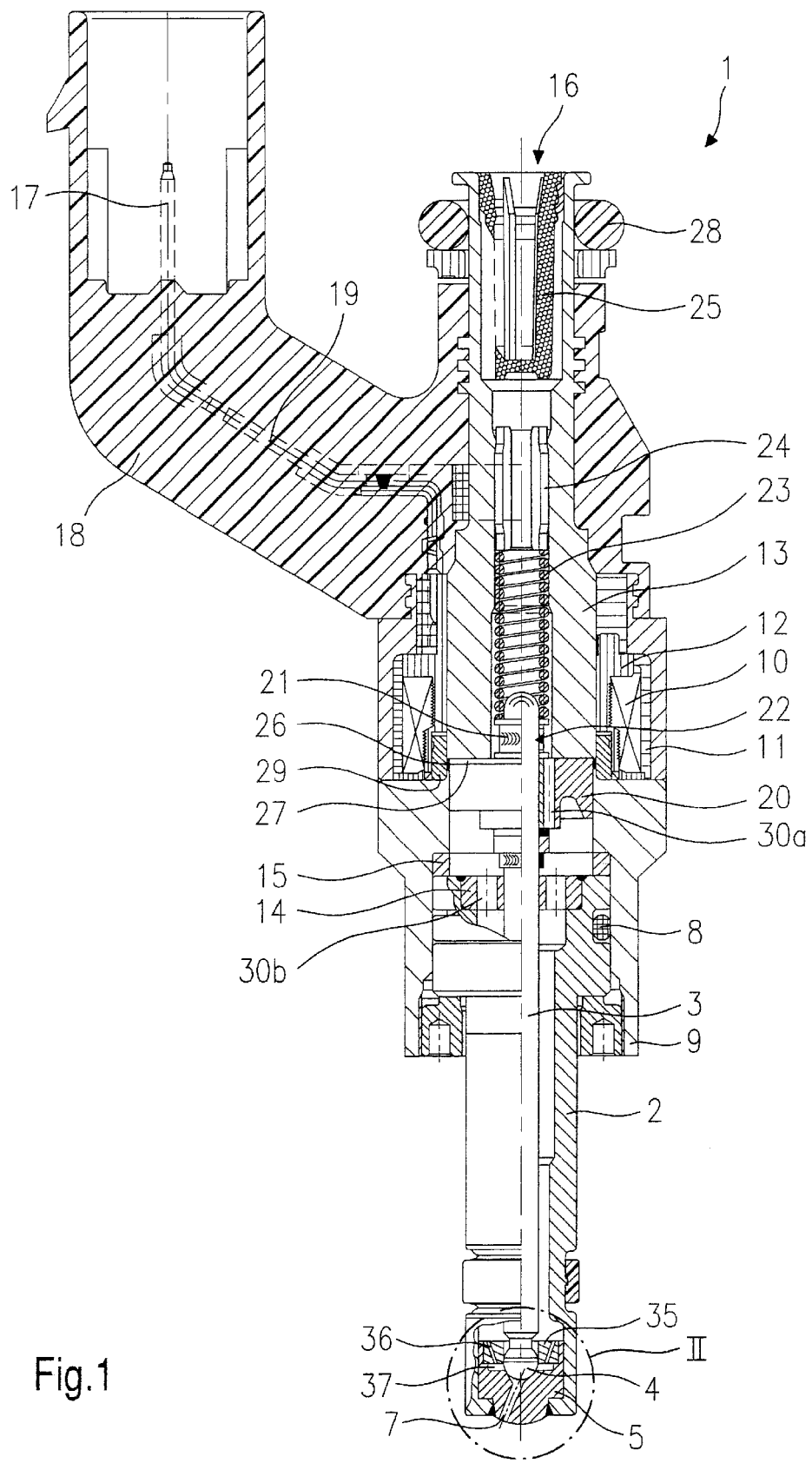
FIG. 1 shows a schematic partial section through an exemplary embodiment of a fuel injector according to the present invention.
Figure 2:
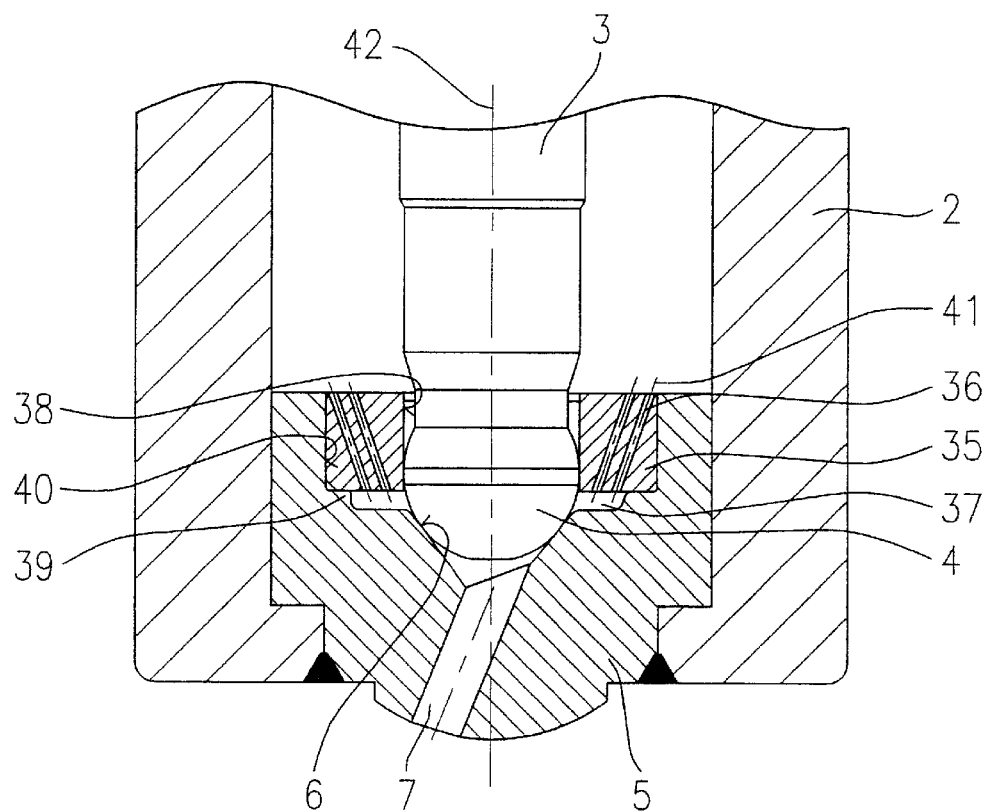
FIG. 2 shows a schematic part-section of a detail II of FIG. 1 through the example embodiment of the fuel injector with a contact surface in the axial direction.
Figure 3:
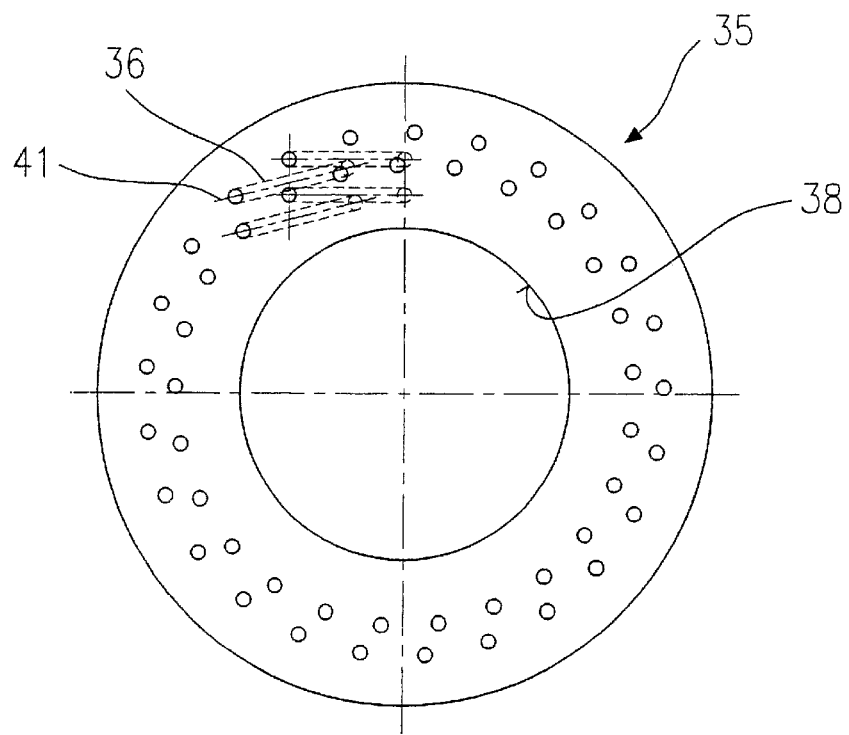
FIG. 3 shows a view of the upstream side of a swirl disk of the exemplary embodiment of the fuel injector.

Before an exemplary embodiment of a swirl disk of a fuel injector 1 according to the present invention is described more precisely with the aid of FIGS. 2 and 3, to better understand the present invention, fuel injector 1 is briefly explained in an overall representation with respect to its main components, on the basis of FIG. 1.

Fuel injector 1 is designed in the form of an injector for fuel-injection systems of mixture-compressing internal combustion engines with externally supplied ignition. Fuel injector 1 is particularly suitable for the direct injection of fuel into a combustion chamber (not shown) of an internal combustion engine.

Fuel injector 1 includes a nozzle body 2, in which a valve needle 3 is positioned. Valve needle 3 is in operative connection with a valve-closure member 4 that cooperates with a valve-seat surface 6, arranged on a valve-seat member 5, to form a sealing seat. In the exemplary embodiment, fuel injector 1 is an inwardly opening, electro-magnetically actuable fuel injector 1 which has a spray-discharge orifice 7. Nozzle body 2 is sealed from external pole 9 of a magnetic coil 10 by a seal 8. Magnetic coil 10 is encapsulated in a coil housing 11 and wound on a bobbin 12, which lies adjacent to an internal pole 13 of magnetic coil 10. Internal pole 13 and external pole :9 are separated from each other by a gap 26 and are supported on a connecting component 29. Magnetic coil 10 is energized via an electric line 19 by an electric current, which can be supplied via an electrical plug-in contact 17. Plug-in contact 17 is enclosed in a plastic jacket 18, which may be sprayed onto internal pole 13.

Valve needle 3 is guided in a valve needle guide 14, which is designed as a disk. A paired adjustment disk 15 adjusts the (valve) lift. On the other side of adjustment disk 15 is an armature 20. It is connected by force-locking to valve needle 3 via a first flange 21, and valve needle 3 is connected to first flange 21 by a welded seam 22. Braced against valve needle 21 is a return spring 23 which, in the present design of fuel injector 1, is prestressed by a sleeve 24.

Fuel channels 30a and 30b run in valve-needle guide 14 and in armature 20. A filter element 25 is disposed in a central fuel supply 16. Fuel injector 1 is sealed from a distributor line (not shown) by a gasket 28.

In the rest position of fuel injector 1, return spring 23, via flange 21 at valve needle 3, acts upon armature 20 counter to its lift direction in such a way that valve-closure member 4 is retained in sealing contact against valve-seat surface 6.

Magnetic coil 10, upon excitation, generates a magnetic field which moves armature 20 in the lift direction, counter to the spring force of return spring 23, the lift being specified by a working gap 27 existing in the rest position between internal pole 13 and armature 20. Armature 20 also carries along in the lift direction first flange 21, which is welded to valve needle 3, and thus valve needle 3. Valve-closure member 4, being operatively connected to valve needle 3, lifts off from valve seat surface 6, and fuel reaching spray-orifice 7 via swirl channels 36 is sprayed off.

When the coil current is turned off, armature 20 falls away from internal pole 13 once the magnetic field has decayed sufficiently, due to the pressure of restoring spring 23 on first flange 21, whereupon valve needle 3 moves in a direction counter to the lift. As a result, valve-closure member 4 comes to rest on valve-seat surface 6, and fuel injector 1 is closed.

FIG. 2, in a part-sectional view, shows an exemplary embodiment of swirl disk 35 with adjacent swirl chamber 37 of a fuel injector 1 according to the present invention.

Swirl disk 35 is in the form of a disk and is fixed in a cylinder-shaped recess 40 of valve-seat member 5. Swirl disk 35 may be mounted by pressing it into valve-seat member 5, for instance. A gap, forming a swirl chamber 37, remains in the axial direction between valve-seat member 5 and swirl disk 35. Swirl disk 35 has a central bore 38 for guiding valve-closure member 4. Relative to the diameter of valve-closure member 4, bore 38 is toleranced so as to prevent a gap from forming as a secondary flow path for the fuel between valve-closure member 4 and swirl disk 35.

To guide the flow, a plurality of swirl channels 36 is introduced in swirl disk 35 whose center axes 41 may be inclined at identical or different angles with respect to center axis 42 of fuel injector 1. When fuel injector 1 is open, the fuel flows through swirl channels 36 into swirl chamber 37. There it will receive a circumferential speed, due to a tangential component of swirl channels 36. The swirl of the fuel generated in this manner causes the fuel to be sprayed off onto a cone-shaped shell whose opening angle is a function of the swirl generated in swirl chamber 37. Swirl chamber 37 has a cylinder shape and its height is bounded by valve-seat member 5 and swirl disk 35.

The diameter of swirl channels 36 is smaller than the diameter of the dirt particles present in the fuel. Swirl disk 35 thus supplements the function of filter 25. At the same time, the entire cross-section of the swirl channels is able to specify the metered fuel quantity for the completely open fuel injector.

The height of swirl chamber 37 is specified by a stop 39. Swirl disk 35 is inserted into valve-seat member 5 until it makes contact with stop 39. Stop 39, may be in the form of an annular shoulder reaching into cylindrical recess 40 of valve-seat member 5 and, at the same time, forms the radial boundary of swirl chamber 37. The inner diameter of annular shoulder 39 is just large enough to allow the downstream side of swirl channels 36 to discharge into swirl chamber 37.

Valve-closure member 4 has a preferably spherical geometry on its side forming the sealing seat, and remains in sealing contact with valve-seat member 5 when valve needle 3 is inclined relative to the center axis of fuel injector 1.

FIG. 3 shows an upstream view of swirl disk 35. Swirl channels 36 are arranged on two concentric hole circles, for instance. Center axes 41 of swirl channels 36 are preferably equidistant along the periphery of the respective hole circle and, run in an inclined yet parallel manner with respect to each other relative to the center axis of fuel. injector 1.

A single swirl channel 36 forms the most narrow point for the flow-through along the flow route of the fuel to spray-off orifice 7. Downstream from swirl channel 35, the smallest extension of the flow path is greater in each spatial direction than the diameter of a single swirl channel 36. Therefore, valve-closure member 4 especially lifts off to such an extent that the gap formed between lifted-off valve-closure member 4 and valve-seat surface 6, extending in the radial direction from the center point of spherical valve-closure member 4, is greater at its most narrow point than the diameter of the most narrow swirl channel 36. In this way, it is prevented that dirt particles, which are carried through swirl channels 36 by the fuel flow, deposit in the area of swirl chamber 37 or the valve-sealing seat. Preferably, the diameter of swirl channels 36 is smaller than the opening lift at which valve-closure member 4 lifts off from valve-seat surface 6 during the opening movement. In this way it is ensured that tiny dirt particles are held back from swirl disk 35 if they are larger than the opening lift. Contamination and blockage of the sealing seat are thus prevented.

In this manner, the sealing function of valve-closure member 4 and corresponding valve-seat surface 6 is ensured over the service life of fuel injector 1.

Swirl channels 36 may be introduced, for instance, by laser drilling or by micro-eroding. Swirl channels 36 are preferably introduced before swirl disk 35 is hardened and the guide play is ground.

What is claimed is:

1. A fuel injector for a fuel-injection system of an internal combustion engine, comprising:

a valve-seat member provided with a valve-seat surface;

a valve closure member, the valve-seat surface cooperating with the valve-closure member to form a sealing seat;

a swirl disk provided with swirl channels having a tangential component for generating swirl, the swirl disk being disposed upstream from the valve-seat surface of the valve-seat member; and a swirl chamber formed between the swirl disk and the valve-seat member;

wherein a minimal extension of flow paths arranged downstream from the swirl disk is greater in every spatial direction than a smallest diameter of each swirl channel in the swirl disk.

2. The fuel injector according to claim 1, wherein a diameter of the swirl channels is smaller than a diameter of dirt particles that are present in fuel in the fuel injector.

3. The fuel injector according to claim 1, wherein the swirl channels are disposed on a plurality of concentric hole circles.

4. The fuel injector according to claim 1, wherein each of the swirl channels has a different diameter.

5. The fuel injector according to claim 1, wherein each of the swirl channels has a different orientation.

6. The fuel injector according to claim 1, wherein the swirl disk has at least 100 swirl channels.

7. The fuel injector according to claim 1, wherein the swirl channels are introduced into the swirl disk by laser drilling.

8. The fuel injector according to claim 1, wherein the swirl channels are introduced into the swirl disk by micro-erosive machining.

9. The fuel injector according to claim 1, wherein the smallest diameter of each swirl channel is smaller than an opening lift at which the valve-closure member lifts off from the valve-seat surface during an opening movement.

10. The fuel injector according to claim 1, wherein a diameter of the swirl channels is smaller than a diameter of dirt particles that are present in fuel in the fuel injector, and the swirl channels are disposed on a plurality of concentric hole circles.

11. The fuel injector according to claim 10, wherein each of the swirl channels has a different diameter.

12. The fuel injector according to claim 11, wherein each of the swirl channels has a different orientation.

13. The fuel injector according to claim 10, wherein the swirl disk has at least 100 swirl channels.

14. The fuel injector according to claim 12, wherein the swirl channels are introduced into the swirl disk by laser drilling.

15. The fuel injector according to claim 12, wherein the swirl channels are introduced into the swirl disk by micro-erosive machining.

16. The fuel injector according to claim 12, wherein the smallest diameter of each swirl channel is smaller than an opening lift at which the valve-closure member lifts off from the valve-seat surface during an opening movement.

17. The fuel injector according to claim 10, wherein the smallest diameter of each swirl channel is smaller than an opening lift at which the valve-closure member lifts off from the valve-seat surface during an opening movement.

18. The fuel injector according to claim 1, wherein relative to a diameter of the valve-closure member, a bore is toleranced to prevent a gap from forming as a secondary flow path for the fuel between valve-closure member and the swirl disk.

19. The fuel injector according to claim 1, wherein the swirl disk has center axes that are inclined at one of identical and different angles with respect to a center axis of the fuel injector.

20. The fuel injector according to claim 1, wherein the swirl chamber has a cylinder shape and its height is bounded by the valve-seat member and the swirl disk.

21. The fuel injector according to claim 1, wherein an entire cross-section of the swirl channels is able to specify a metered fuel quantity when the fuel injector is completely open.

22. The fuel injector according to claim 1, wherein a height of the swirl chamber is specified by a stop, and the swirl disk is insertable into the valve-seat member until it contacts the stop.

23. The fuel injector according to claim 22, wherein the stop includes an annular shoulder reaching into a cylindrical recess of the valve-seat member and forms a radial boundary of the swirl chamber.

24. The fuel injector according to claim 23, wherein an inner diameter of the annular shoulder is just large enough to allow a downstream side of the swirl channels to discharge into the swirl chamber.

25. The fuel injector according to claim 1, wherein the valve-closure member has a spherical geometry on its side forming the sealing seat, and remains in sealing contact with the valve-seat member when the valve needle is inclined relative to a center axis of the fuel injector.

26. The fuel injector according to claim 1, wherein center axes of the swirl channels are equidistant along a periphery of a respective hole circle, and run in an inclined and parallel manner with respect to each other relative to a center axis of the fuel injector.

27. The fuel injector according to claim 1, wherein the valve-closure member lifts off to such an extent that a gap formed between a lifted-off valve-closure member and a valve-seat surface, extending in a radial direction from a center point of the valve-closure member 4, is greater at its most narrow point than a diameter of a most narrow swirl channel, so as to prevent dirt particles, which are carried through the swirl channels by fuel flow, from depositing in an area of the swirl chamber or the valve-sealing seat.

28. The fuel injector according to claim 27, wherein a diameter of the swirl channels is smaller than an opening lift at which the valve-closure member lifts off from the valve-seat surface during an opening movement, so that at least some dirt particles are held back from the swirl disk if they are larger than the opening lift.

\* \* \* \* \*